Sept. 17, 1929.   L. A. BEARDSLEY   1,728,324
GAME TRAP
Filed April 3, 1926

INVENTOR
LESTER A. BEARDSLEY
BY Charles H. Wilson
ATTORNEY

Patented Sept. 17, 1929

1,728,324

UNITED STATES PATENT OFFICE

LESTER A. BEARDSLEY, OF NORWICH, NEW YORK, ASSIGNOR TO NORWICH WIRE WORKS, INC., OF NORWICH, NEW YORK, A CORPORATION OF NEW YORK

GAME TRAP

Application filed April 3, 1926. Serial No. 99,504.

This invention relates to game traps, more particularly to traps of the long spring type and one of the objects of the invention is to provide a trap of this type, which will occupy a minimum amount of space when the trap is set.

Another object of the invention is to provide a trap of the long spring type, wherein a relatively longer actuating spring may be provided than has obtained in traps of given sizes as hitherto constructed, and wherein the actuating spring is so constructed and assembled with respect to the other operative parts of the trap, that the spring does not project substantially beyond the base plate or foundation of the trap, permitting the trap to be set with a minimum disturbance of the surroundings of the place where the trap is set.

A further object of the invention is to provide a trap of the long spring type which may be more economically constructed than it has been possible hitherto to construct traps of this type; a saving being effected both in the number of parts utilized and in their assemblage.

Other objects and aims of the invention, more or less specific than those referred to above, will be in part obvious and in part pointed out in the course of the following description of the elements, combinations, arrangements of parts and application of principles, constituting the invention; and the scope of protection contemplated will be indicated in the appended claim.

In the accompanying drawing, wherein I have illustrated a preferred form of embodiment of my invention, Figure 1 is a top plan view of my improved trap.

Figure 1:
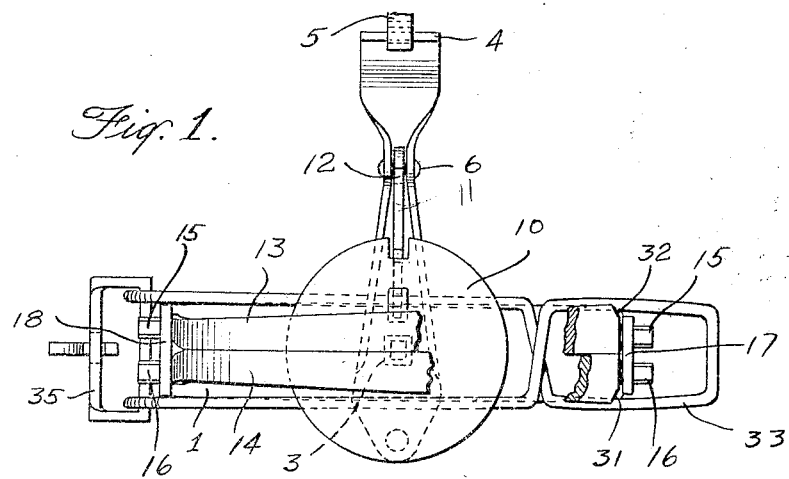

Referring now to the drawings, the reference numeral 1 denotes the base or foundation of the trap, 2 the cross piece which is anchored to the foundation intermediate its ends, as by means of the rivet 3. The cross piece 2 which is preferably flanged upwardly to give it strength and stiffness, extends laterally of the trap and is provided at its outer end with an upwardly extending flange 4, upon which is pivotally mounted a detent 5. Pivotally mounted upon the pin 6 which extends through the flanges 7 and 8 of the cross piece, is an arm 9, upon which is mounted the pan 10 of the trap. The arm 9 is recessed at 11 to form the shoulder 12, under which the detent 5 is received when the trap is set.

The reference numerals 13 and 14 denote the jaws of the trap, which jaws having formed upon their end portions the pintles 15 and 16 respectively, are received in apertures formed in upwardly extending flanges 17 and 18 provided respectively upon the outer ends of the foundation 1.

As thus far described, this trap does not differ materially from other well known forms of game traps.

Referring now to the actuating means for the jaws of the trap, the reference numeral 19 denotes a spring preferably of V-shaped formation. This spring is formed of a single piece of spring wire, bent upon itself to form a loop 20; the legs of said loop crossing each other at the point 21 to form the eye 22 adapted to receive the legs 23 and 24 of the jaws 13 and 14 respectively. The advantages of the crossed wire construction are that the eye 22 is rendered materially stronger, and the spring may be made consequently lighter, thus reducing the weight of the trap as a whole. Furthermore, when the trap is sprung the eye 22 acts evenly upon the side members 33 and 34 because the eye is much stiffer by reason of the crossed wire formation and arrangement and distortion is resisted.

The legs 25 and 26 of the loop 20 extend rearwardly to a point adjacent the flange 18 of the foundation 1 and then extend forwardly underneath said foundation whence they pass through apertures 27 and 28 formed in the forward end of the foundation. The free ends 29 and 30 of said legs extend forwardly after passing through said apertures.

Figure 2:
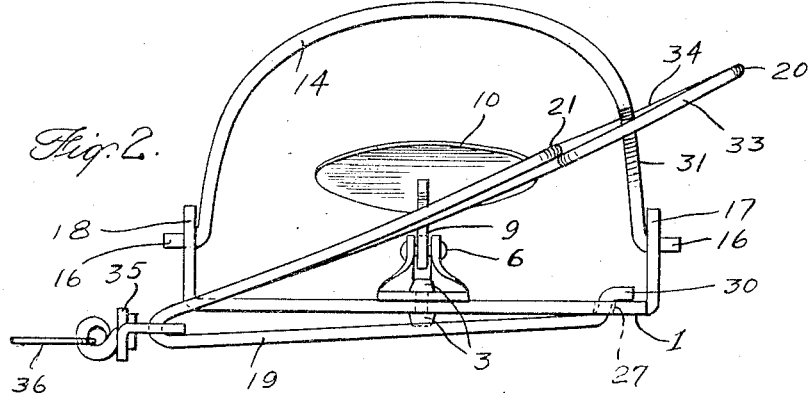
Figure 2 is a side elevational view thereof.
Figure 3:
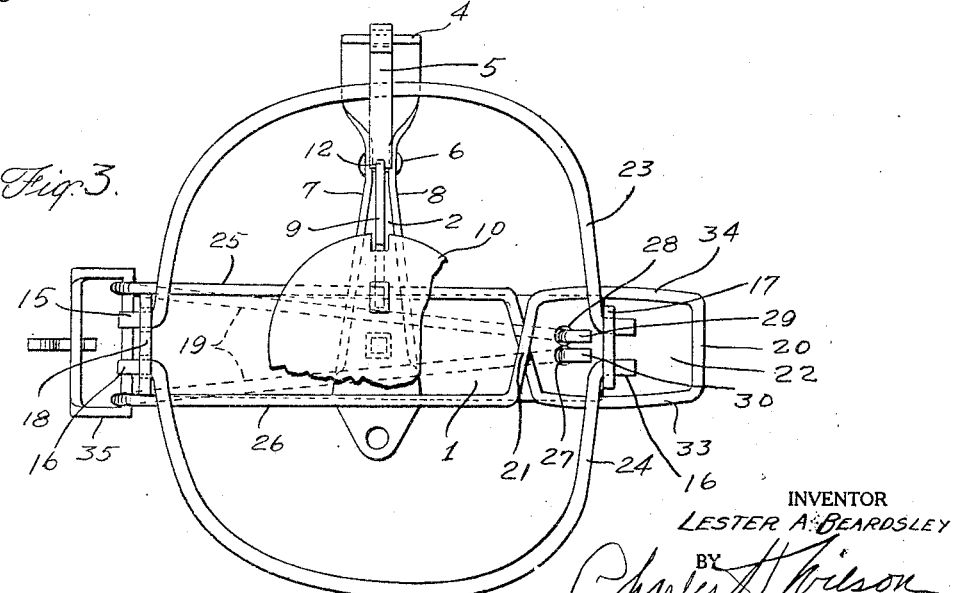
Figure 3 is a view similar to Figure 1, but showing the trap in set condition.

The legs 23 and 24 of the jaws 13 and 14 are provided with inclined shoulders 31 and 32 which are adapted to be engaged by the side members 33 and 34 of the loop 20, so that when said loop moves upwardly, the jaws will be moved into the closed position illustrated in Figures 1 and 2.

The spring 19, it will be noted, is maintained under constant tension from its point of anchorage in the apertures 28 and 29 of the base plate, to its point of engagement with the shoulders 31 and 32 of the jaws, whereby said spring has a constant tendency to move said jaws into closed position.

At this point it will be noted, that when the jaw 13 is swung downwardly and held in locked position by means of the detent 5 against the tendency of the spring 19 to return the jaw to the position shown in Figures 1 and 2, inasmuch as the strain is received upon the leg 34 of the loop 20, there is a tendency to impart to the loop 20 a lateral twist in the direction of the locked jaw. Ordinarily this would cause the free jaw 24, when the trap is set, to be lifted by the leg 33 of said loop to a position inclined with respect to the locked jaw 13. This objection is cured by so positioning the length of wire composing the loop 20 that the leg 33 of the loop lies underneath the plane of the leg 34 of said loop, the relative disposition of these legs being such, that when the trap is in set condition, the legs 33 and 34 of the loop 20 will lie in the same horizontal plane. Thus, the jaws 13 and 14 will have their working faces lying in substantially the same plane when the trap is in set condition.

The reference numeral 35 denotes a shackle positioned about the spring member 19, to which the anchoring chain 36 may be attached.

In assembling this trap, assuming that the base plate has been formed and the cross piece with its associate parts mounted thereon, it is merely necessary for the assembler to insert the ends 29 and 30 of the spring 19 into the apertures 27 and 28 of the foundation, whereupon the legs 23 and 24 of the jaws 13 and 14 may be inserted through the eye 22 of the loop 20, whereupon the pintles 15 and 16 of the jaws may be sprung into the apertures of the flanges 17 and 18 of the base plate. There are therefore, but two operations required in the assemblage of the trap proper.

Inasmuch as the spring 19 is free of engagement with any part of the trap from its point of anchorage in the base plate 1 to its point of engagement with the shoulders 31 and 32 of the jaws 13 and 14, it will be seen that the entire length of this spring is utilized as an actuating member for the trap jaws. The bending of the spring in service, is distributed through its entire length, rather than at a localized point, such as obtains in traps of the "long spring" type as hitherto constructed. Moreover, the disposition of the spring with respect to the other parts of the trap, is such that it does not extend substantially beyond the ends of the foundation. It is, therefore, less cumbersome than traps of the "long spring" type as hitherto constructed.

It will accordingly be seen that I have provided a construction, to attain, among others, all the ends and objects in an exceedingly simple manner, and that I have provided a trap of the long spring type which while possessing the advantages of the latter form of spring, is nevertheless possessed of the advantage of traps of the coil spring type, both as regards cost of production and economy in assemblage. It also occupies a minimum amount of space when set.

As many changes could be made in this struction without departing from the scope of the following claim, it is intended that all matter contained in the above description or shown in the accompanying drawings, shall be interpreted as illustrative only and not in a limiting sense.

Having thus described my invention, what I claim as new and desire to secure by Letters Patent, is:—

In a game trap, the combination with twin pivoted jaws, of a base for the jaws, a bait pan, an escapement device adapted to engage the said pan and arranged to hold the jaws open when the trap is set, and a V-shaped operating spring having a lower pair of spaced legs extending across the trap below the base thereof, the said spring having an upper continuous portion comprising spaced legs extending across the middle of the trap above the base, the terminal portions of the said upper legs being crossed one over the other to form an eye arranged to engage and operate the jaws when the trap is sprung.

In testimony whereof, I affix my signature.

LESTER A. BEARDSLEY.